US012505966B2

(12) United States Patent
Huang

(10) Patent No.: US 12,505,966 B2
(45) Date of Patent: Dec. 23, 2025

(54) SLIDE SWITCH

(71) Applicant: Cheng Uei Precision Industry Co., Ltd., New Taipei (TW)

(72) Inventor: Che Hung Huang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 250 days.

(21) Appl. No.: 18/398,086

(22) Filed: Dec. 27, 2023

(65) Prior Publication Data

US 2024/0321535 A1 Sep. 26, 2024

(30) Foreign Application Priority Data

Mar. 22, 2023 (CN) ......................... 202320601791.8

(51) Int. Cl.

*H01H 15/04* (2006.01)
*H01H 13/10* (2006.01)
*H01H 13/14* (2006.01)
*H01H 15/00* (2006.01)
*H01H 15/18* (2006.01)

(52) U.S. Cl.

CPC ............ *H01H 15/04* (2013.01); *H01H 13/10* (2013.01); *H01H 13/14* (2013.01); *H01H 15/005* (2013.01); *H01H 15/18* (2013.01); *H01H 2221/03* (2013.01)

(58) Field of Classification Search

CPC ........ H01H 15/04; H01H 13/10; H01H 13/14; H01H 15/005; H01H 15/18; H01H 2221/03; H01H 15/10

See application file for complete search history.

(56) References Cited

U.S. PATENT DOCUMENTS 7,985,935 B2 * 7/2011 Sanford ............... H01H 15/005 200/547
8,093,525 B2 * 1/2012 Altmann .............. H01H 15/107 200/537
8,338,733 B2 * 12/2012 Yang .................... H01H 15/107 361/679.01
2001/0007449 A1 * 7/2001 Kobachi ............... G06F 3/0421 345/156

* cited by examiner

*Primary Examiner* — Ahmed M Saeed

(57) ABSTRACT

A slide switch includes a housing, two guiding slots, a slider, a push button, a first switch, a second switch, a third switch and two stopping blocks. Two middles of two inner surfaces of the housing protrude inward to form two supporting portions. A horizontal sliding path is formed among the two guiding slots and the two supporting portions. The slider is mounted between the two guiding slots. The push button is perpendicularly mounted to the slider. The first switch is positioned to one side of the sliding path. The second switch is positioned to the other side of the sliding path. The third switch is positioned to a center of the sliding path. The two stopping blocks are positioned at two opposite sides of the sliding path, respectively.

7 Claims, 5 Drawing Sheets

SLIDE SWITCH

CROSS-REFERENCE TO RELATED APPLICATIONS

The present application is based on, and claims priority from, China Patent Application No. 202320601791.8, filed Mar. 22, 2023, the disclosure of which is hereby incorporated by reference herein in its entirety.

PRIOR ART

With the popularization of various electronic devices, in order to make operations of electronic devices more convenient and faster, a switch structure is emerged. In the single switch structure, a number of different operation modes such as a slide operation mode, a directional push operation mode and a pressing operation mode are triggered. However, the operation modes that may trigger the switch structure is increased, so a chance of causing a misoperation is also increased synchronously.

Therefore, it is necessary to provide an innovative switch structure which is a multioperation mode switch. The innovative switch structure is a slide switch. The slide switch is able to simultaneously avoid a false triggering in a status of maintaining the compact switch structure.

BACKGROUND OF THE INVENTION

The present invention generally relates to a switch structure, and more particularly to a slide switch which is able to avoid a false triggering.

SUMMARY OF THE INVENTION

An object of the present invention is to provide a slide switch which is able to avoid a false triggering. The slide switch includes a housing, two guiding slots, a slider, a push button, a first switch, a second switch, a third switch and two stopping blocks. An inside of the housing forms an accommodating space. The housing includes a front housing and a rear housing covered to a rear of the front housing. The accommodating space is formed between the front housing and the rear housing. The front housing has a front wall, and a first top wall protruded rearward from a top of the front wall. The rear housing has a rear wall opposite to the front wall, and a second top wall protruded frontward from a top of the rear wall. Two middles of two inner surfaces of the front wall and the rear wall of the housing protrude inward to form two supporting portions. One guiding slot is formed between the first top wall and a top surface of one supporting portion. The other guiding slot is formed between the second top wall and a top surface of the other supporting portion. A horizontal sliding path is formed among the two guiding slots and the two supporting portions. The slider is mounted between the two guiding slots to make the slider slide horizontally along the sliding path. The push button is perpendicularly mounted to a top of the slider, and the slider brings along the push button to slide horizontally. The first switch is positioned to one side of the sliding path. The second switch is positioned to the other side of the sliding path. The third switch is positioned to a center of the sliding path. The two stopping blocks are positioned at two opposite sides of the sliding path, respectively to limit a sliding displacement of the push button.

Another object of the present invention is to provide a slide switch which is able to avoid a false triggering. The slide switch includes a housing, two guiding slots, a slider, a push button, a first switch, a second switch, a third switch and two stopping blocks. An inside of the housing forms an accommodating space. The housing includes a front housing and a rear housing covered to a rear of the front housing. The accommodating space is formed between the front housing and the rear housing. The front housing has a front wall, and a first top wall protruded rearward from a top of the front wall. The rear housing has a rear wall opposite to the front wall, and a second top wall protruded frontward from a top of the rear wall. Two middles of two inner surfaces of the front wall and the rear wall of the housing protrude inward to form two supporting portions. One guiding slot is formed between the first top wall and a top surface of one supporting portion. The other guiding slot is formed between the second top wall and a top surface of the other supporting portion. A horizontal sliding path is formed among the two guiding slots and the two supporting portions. The slider is mounted between the two guiding slots to make the slider slide horizontally along the sliding path. A middle of a bottom of a front end of the slider protrudes downward to form a blocking block. The push button is perpendicularly mounted to a top of the slider, and the slider brings along the push button to slide horizontally. The first switch is positioned to one side of the sliding path. The second switch is positioned to the other side of the sliding path. The third switch is positioned to a center of the sliding path. The two stopping blocks are positioned at two opposite sides of the sliding path, respectively to limit a sliding displacement of the push button. The two stopping blocks form two partial shells of the first switch and the second switch, respectively. When the slider moves to the one side of the sliding path, the blocking block is propped by one partial shell to avoid the push button moving downward, and when the slider moves to the other side of the sliding path, the blocking block is propped by the other partial shell to avoid the push button moving downward.

Another object of the present invention is to provide a slide switch which is able to avoid a false triggering. The slide switch includes a housing, two guiding slots, a slider, a push button, a first switch, a second switch, a third switch and two partial shells of the first switch and the second switch. An inside of the housing forms an accommodating space. The housing includes a front housing and a rear housing covered to a rear of the front housing. The accommodating space is formed between the front housing and the rear housing. The front housing has a front wall, and a first top wall protruded rearward from a top of the front wall. The rear housing has a rear wall opposite to the front wall, and a second top wall protruded frontward from a top of the rear wall. Two middles of two inner surfaces of the front wall and the rear wall of the housing protrude inward to form two supporting portions. One guiding slot is formed between the first top wall and a top surface of one supporting portion. The other guiding slot is formed between the second top wall and a top surface of the other supporting portion. A horizontal sliding path is formed among the two guiding slots and the two supporting portions. The slider is mounted between the two guiding slots to make the slider slide horizontally along the sliding path. A middle of a bottom of a front end of the slider protrudes downward to form a blocking block. The push button is perpendicularly mounted to a top of the slider, and the slider brings along the push button to slide horizontally. The first switch is positioned to one side of the sliding path. The second switch is positioned to the other side of the sliding path. The first switch is spaced from the second switch. The third switch is positioned to a center of the sliding path. The third switch is positioned between the first switch and the second switch. The first switch, the second switch and the third switch are disposed separately. The partial shells of the first switch and the second switch are positioned at two opposite sides of the sliding path, respectively to limit a sliding displacement of the push button. An interval is formed between the partial shells. The first switch and the second switch further have two trigger blocks positioned on two top surfaces of the two partial shells. When the slider is pushed to a terminal position of one of the two opposite sides of the sliding path. The blocking block pushes against the trigger block of one of the first switch and the second switch, and the blocking block triggers the one of the first switch and the second switch. When the push button is pushed to make the slider back to the center of the sliding path, the blocking block moves away from the two partial shells, at the moment, the push button is able to be pressed downward to make the blocking block trigger the third switch, when the push button is pressed downward, the blocking block passes downward through the sliding path and passes through the interval between the two partial shells, the slider and the push button are further limited to slide horizontally.

As described above, the slide switch includes the housing, the inside of the housing is hollow to form the accommodating space, the slider is horizontally slided in the accommodating space, the push button is perpendicularly mounted in the slider, and the slider brings along the push button to slide horizontally, the first switch is positioned to the one side of the sliding path, the second switch is positioned to the other side of the sliding path, the third switch is positioned to the center of the sliding path, and the two stopping blocks are positioned at the two opposite sides of the sliding path respectively to limit the sliding displacement of the push button. A movement ability of the push button is limited by the two stopping blocks, the push button is unable to be pressed downward when the push button slides horizontally, and when the push button is pressed downward, the push button is unable to slide horizontally, so that the clear handling feel of the push button of the slide switch is increased, and the slide switch which is a multioperation mode switch simultaneously avoids the false triggering in a status of maintaining a compact switch structure.

BRIEF DESCRIPTION OF DRAWINGS

The present invention will be apparent to those skilled in the art by reading the following description, with reference to the attached drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
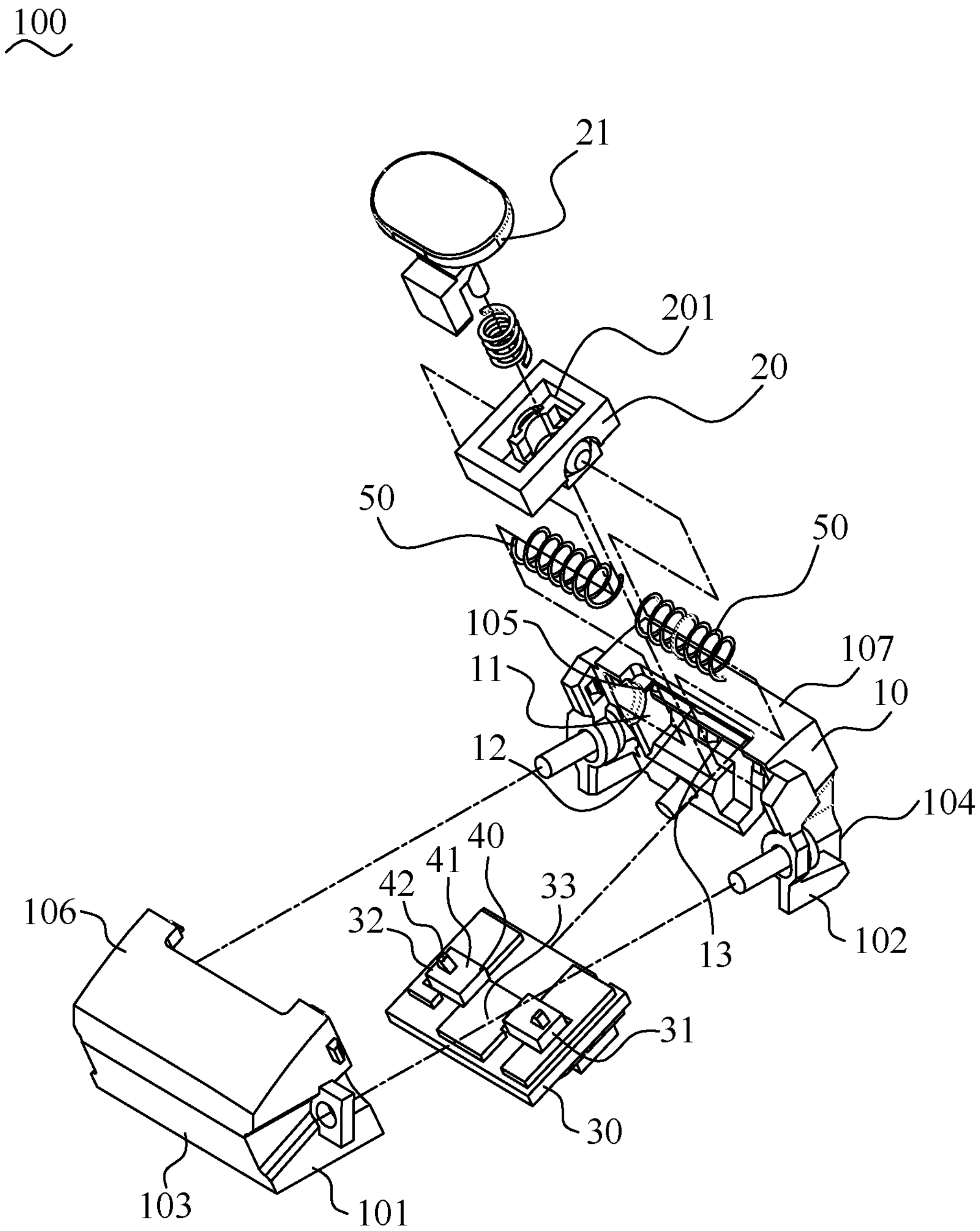
FIG. 1 is an exploded view of a slide switch in accordance with a preferred embodiment of the present invention.

Referring to FIG. 1, a slide switch 100 in accordance with a preferred embodiment of the present invention is shown. The slide switch 100 includes a housing 10, a slider 20, a push button 21, a circuit board 30, a first switch 31, a second switch 32, a third switch 33, two stopping blocks 40 and two restoring springs 50.

An inside of the housing 10 is hollow to form an accommodating space 11. The housing 10 includes a front housing 101, and a rear housing 102 covered to a rear of the front housing 101. The accommodating space 11 is formed between the front housing 101 and the rear housing 102. The front housing 101 has a front wall 103, and a first top wall 106 protruded rearward from a top of the front wall 103. The rear housing 102 has a rear wall 104 opposite to the front wall 103, and a second top wall 107 protruded frontward from a top of the rear wall 104. Two middles of two inner surfaces of the front wall 103 and the rear wall 104 of the housing 10 protrude inward to form two supporting portions 105. The two supporting portions 105 are rectangular. Two top surfaces of the two supporting portions 105 are spaced from the first top wall 106 and the second top wall 107 to form two guiding slots 12. One guiding slot 12 is formed between the first top wall 106 and the top surface of one supporting portion 105. The other guiding slot 12 is formed between the second top wall 107 and the top surface of the other supporting portion 105. A horizontal sliding path 13 is formed among the two guiding slots 12 and the two supporting portions 105.

Figure 2:
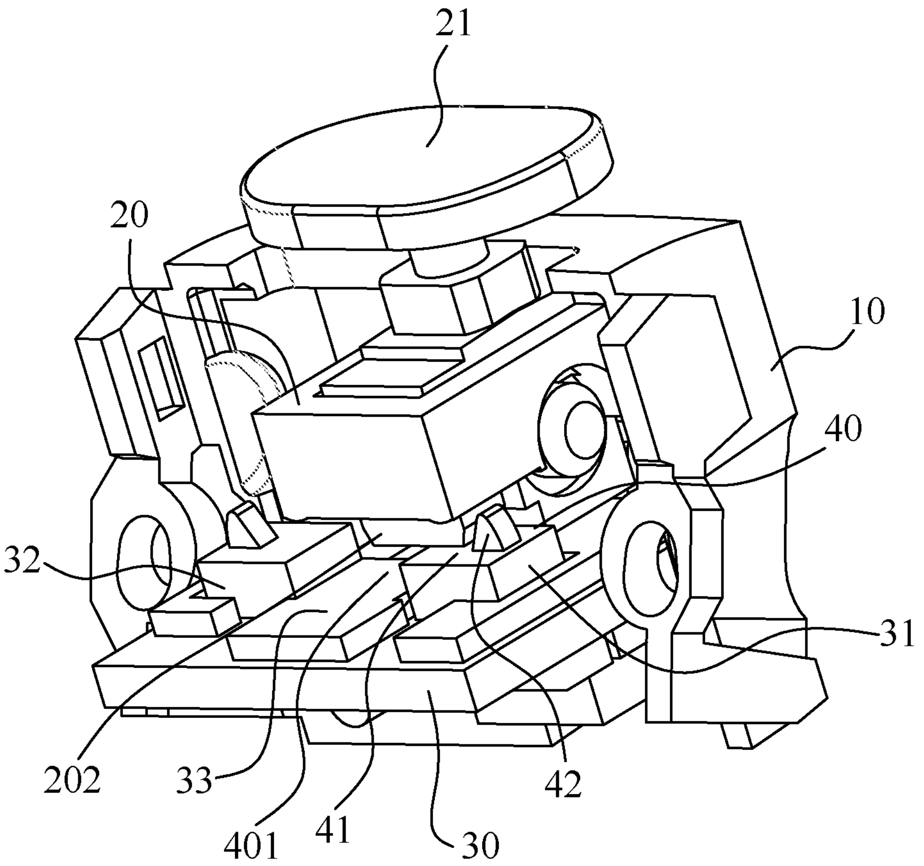
FIG. 2 is a diagrammatic drawing that shows a slider triggers a first switch of the slide switch according to the preferred embodiment of the present invention.
Figure 3:
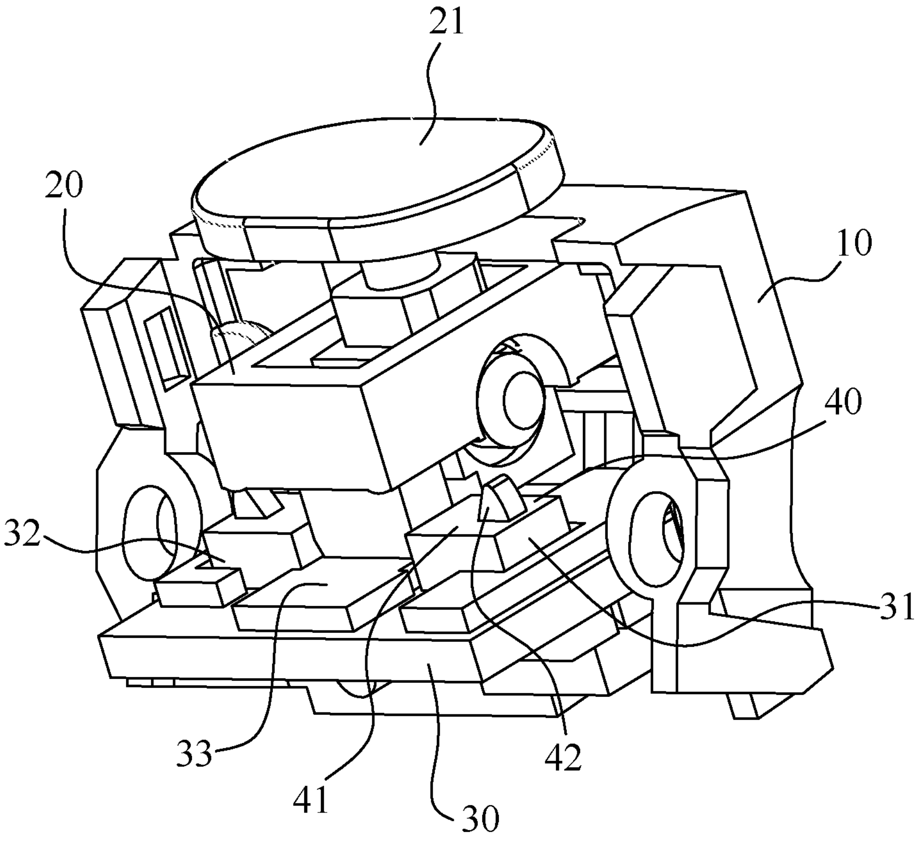
FIG. 3 is a diagrammatic drawing that shows a push button triggers a third switch of the slide switch according to the preferred embodiment of the present invention.

Referring to FIG. 1 and FIG. 2, the slider 20 is horizontally slided in the accommodating space 11. The slider 20 is mounted between the two guiding slots 12 to make the slider 20 slide horizontally along the sliding path 13. A middle of a top of the slider 20 is opened freely to form a receiving space 201. A middle of a bottom of a front end of the slider 20 protrudes downward to form a blocking block 202. The push button 21 is perpendicularly mounted to the top of the slider 20, and the slider 20 brings along the push button 21 to slide horizontally. The push button 21 is perpendicularly mounted in the receiving space 201 of the slider 20, and a top end of the push button 21 protrudes beyond the top of the slider 20. The slider 20 brings along the push button 21 to slide horizontally.

The circuit board 30 is assembled in the accommodating space 11 of the housing 10. The circuit board 30 is positioned under the sliding path 13. The first switch 31 is arranged on an upper surface of the circuit board 30, and the first switch 31 is positioned to one side of the sliding path 13. The second switch 32 is arranged on the upper surface of the circuit board 30, and the second switch 32 is positioned to the other side of the sliding path 13. The third switch 33 is arranged on the upper surface of the circuit board 30, and the third switch 33 is positioned to a center of the sliding path 13. The third switch 33 is positioned under the center of the sliding path 13. The first switch 31 is spaced from the second switch 32 to form an interval 401 between the first switch 31 and the second switch 32. The third switch 33 is positioned between the first switch 31 and the second switch 32. The third switch 33 is located in the interval 401. The first switch 31, the second switch 32 and the third switch 33 are disposed separately.

The two stopping blocks 40 are arranged among the two guiding slots 12, and the circuit board 30. The two stopping blocks 40 are positioned at two opposite sides of the sliding path 13, respectively to limit a sliding displacement of the push button 21. The two restoring springs 50 are compressing springs. The two restoring springs 50 are positioned at two sides of the slider 20, respectively. When the slider 20 is deviated from the center of the sliding path 13, the two restoring springs 50 exert a restoring force on the slider 20 to make the slider 20 slide back to the center of the sliding path 13.

Figure 4:
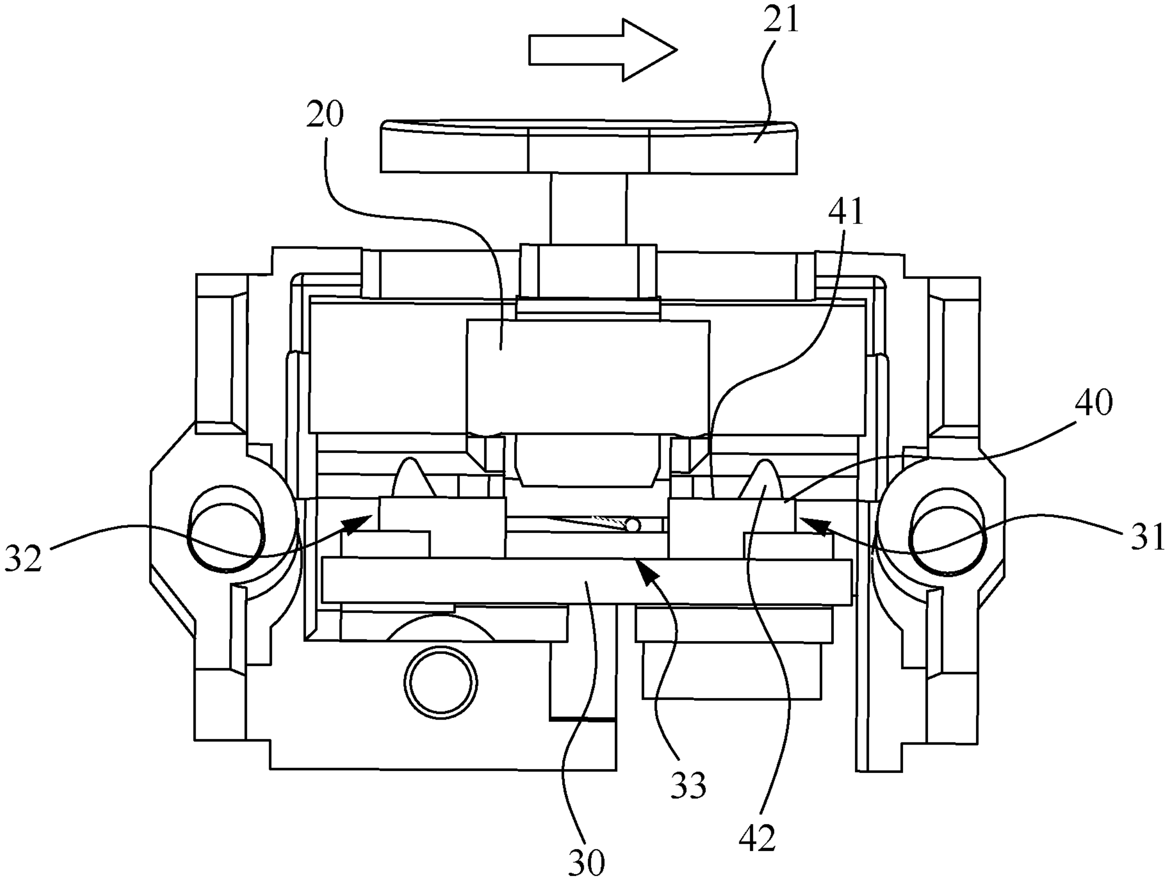
FIG. 4 is a diagrammatic drawing that shows the slider slides towards the first switch of the slide switch according to the preferred embodiment of the present invention.
Figure 5:
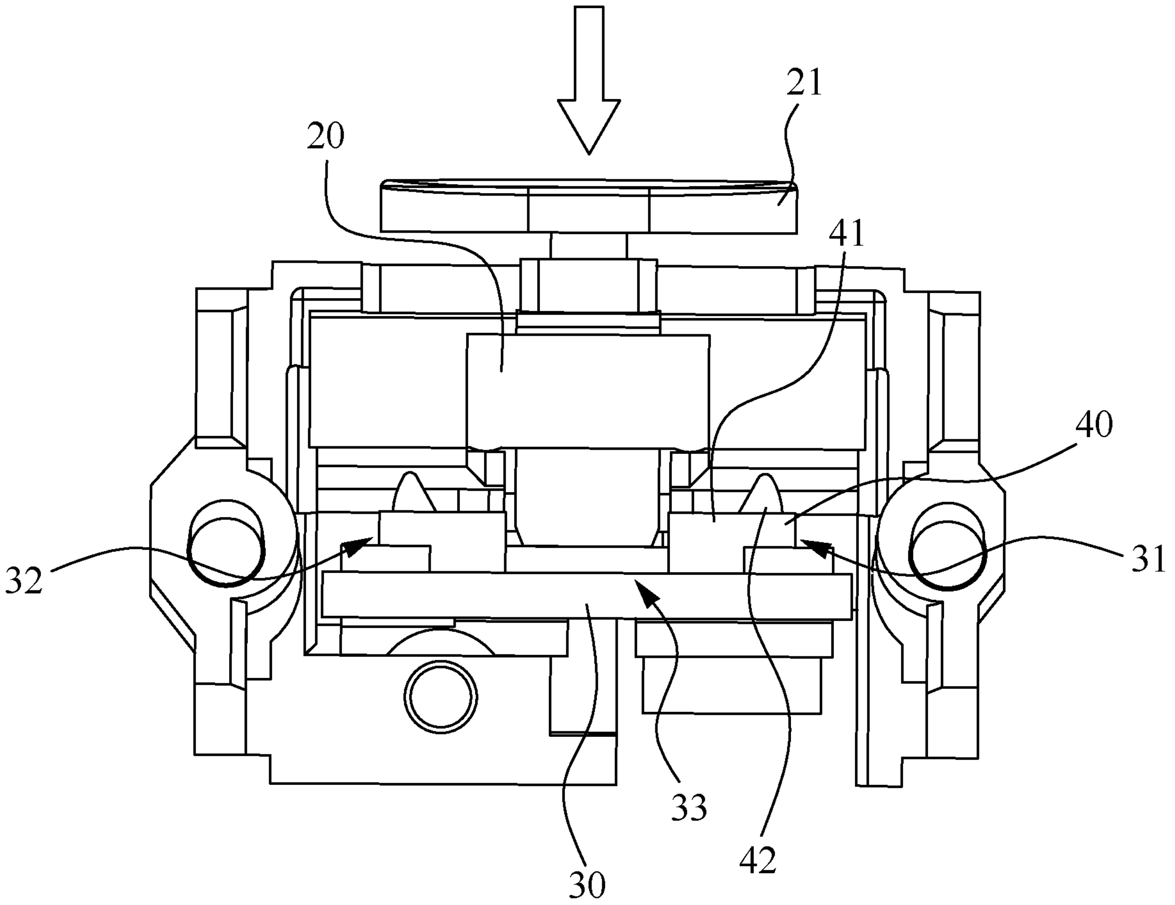
FIG. 5 is another diagrammatic drawing that shows the push button triggers the third switch of the slide switch according to the preferred embodiment of the present invention.

Referring to FIG. 1, FIG. 2 and FIG. 4, in this preferred embodiment, the two stopping blocks 40 form two partial shells 41 of the first switch 31 and the second switch 32, respectively. The two partial shells 41 of the first switch 31 and the second switch 32 are positioned at the two opposite sides of the sliding path 13, respectively to limit the sliding displacement of the push button 21. The interval 401 is formed between the two stopping blocks 40. The interval 401 is formed between the two partial shells 41. The first switch 31 and the second switch 32 further have two trigger blocks 42 positioned on two top surfaces of the two partial shells 41. Therefore, when the slider 20 is pushed away from the center of the sliding path 13, the two partial shells 41 are functioned as the two stopping blocks 40, in that case, when the slider 20 moves to one side of the sliding path 13, the blocking block 202 is propped by one partial shell 41 to avoid the push button 21 moving downward, and when the slider 20 moves to the other side of the sliding path 13, the blocking block 202 is propped by the other partial shell 41 to avoid the push button 21 moving downward, so that a clear handling feel of the push button 21 is ensured, and simultaneously, a false triggering of the third switch 33 is avoided. When the slider 20 is pushed to a terminal position of one of the two opposite sides of the sliding path 13, the slider 20 slides towards one of the first switch 31 and the second switch 32, the blocking block 202 of the slider 20 pushes against the trigger block 42 of the one of the first switch 31 and the second switch 32, and the blocking block 202 of the slider 20 triggers the one of the first switch 31 and the second switch 32.

Referring to FIG. 1 to FIG. 5, when the push button 21 is pushed by a user to make the slider 20 back to the center of the sliding path 13, the blocking block 202 of the slider 20 moves away from two ranges of the two stopping blocks 40 which are the two partial shells 41, at the moment, the push button 21 is able to be pressed downward by the user to make the blocking block 202 of the slider 20 trigger the third switch 33 under an unblocking condition. Meanwhile, when the push button 21 is pressed downward, the blocking block 202 of the slider 20 passes downward through the sliding path 13 and passes through the interval 401 between the two stopping blocks 40 which are the two partial shells 41, the slider 20 and the push button 21 are further limited to slide horizontally.

As described above, the slide switch 100 includes the housing 10, the inside of the housing 10 is hollow to form the accommodating space 11, the slider 20 is horizontally slided in the accommodating space 11, the push button 21 is perpendicularly mounted in the slider 20, and the slider 20 brings along the push button 21 to slide horizontally, the first switch 31 is positioned to the one side of the sliding path 13, the second switch 32 is positioned to the other side of the sliding path 13, the third switch 33 is positioned to the center of the sliding path 13, and the two stopping blocks 40 are positioned at the two opposite sides of the sliding path 13 respectively to limit the sliding displacement of the push button 21. A movement ability of the push button 21 is limited by the two stopping blocks 40, the push button 21 is unable to be pressed downward when the push button 21 slides horizontally, and when the push button 21 is pressed downward, the push button 21 is unable to slide horizontally, so that the clear handling feel of the push button 21 of the slide switch 100 is increased, and the slide switch 100 which is a multioperation mode switch simultaneously avoids a false triggering in a status of maintaining a compact switch structure.

The invention claimed is:

1. A slide switch, comprising:

a housing, an inside of the housing forming an accommodating space, the housing including a front housing and a rear housing covered to a rear of the front housing, the accommodating space being formed between the front housing and the rear housing, the front housing having a front wall, and a first top wall protruded rearward from a top of the front wall, the rear housing having a rear wall opposite to the front wall, and a second top wall protruded frontward from a top of the rear wall, two middles of two inner surfaces of the front wall and the rear wall of the housing protruding inward to form two supporting portions;

two guiding slots, one guiding slot being formed between the first top wall and a top surface of one supporting portion, the other guiding slot being formed between the second top wall and a top surface of the other supporting portion, a horizontal sliding path being formed among the two guiding slots and the two supporting portions;

a slider mounted between the two guiding slots to make the slider slide horizontally along the sliding path;

a push button perpendicularly mounted to a top of the slider, and the slider bringing along the push button to slide horizontally;

a first switch positioned to one side of the sliding path;

a second switch positioned to the other side of the sliding path;

a third switch positioned to a center of the sliding path; and two stopping blocks positioned at two opposite sides of the sliding path, respectively to limit a sliding displacement of the push button.

2. The slide switch as claimed in claim 1, further comprising two restoring springs which are compressing springs, the two restoring springs being positioned at two sides of the slider, respectively, when the slider is deviated from the center of the sliding path, the two restoring springs exerting a restoring force on the slider to make the slider slide back to the center of the sliding path.

3. The slide switch as claimed in claim 1, wherein the two stopping blocks form two partial shells of the first switch and the second switch, respectively, the first switch and the second switch further have two trigger blocks positioned on two top surfaces of the two partial shells.

4. The slide switch as claimed in claim 3, wherein a middle of a bottom of a front end of the slider protrudes downward to form a blocking block, when the slider moves to the one side of the sliding path, the blocking block is propped by one partial shell to avoid the push button moving downward, and when the slider moves to the other side of the sliding path, the blocking block is propped by the other partial shell to avoid the push button moving downward.

5. The slide switch as claimed in claim 1, wherein the first switch is spaced from the second switch to form an interval between the first switch and the second switch, the third switch is located in the interval, the first switch, the second switch and the third switch are disposed separately.

6. A slide switch, comprising:

a housing, an inside of the housing forming an accommodating space, the housing including a front housing and a rear housing covered to a rear of the front housing, the accommodating space being formed between the front housing and the rear housing, the front housing having a front wall, and a first top wall protruded rearward from a top of the front wall, the rear housing having a rear wall opposite to the front wall, and a second top wall protruded frontward from a top of the rear wall, two middles of two inner surfaces of the front wall and the rear wall of the housing protruding inward to form two supporting portions;

two guiding slots, one guiding slot being formed between the first top wall and a top surface of one supporting portion, the other guiding slot being formed between the second top wall and a top surface of the other supporting portion, a horizontal sliding path being formed among the two guiding slots and the two supporting portions;

a slider mounted between the two guiding slots to make the slider slide horizontally along the sliding path, a middle of a bottom of a front end of the slider protruding downward to form a blocking block;

a push button perpendicularly mounted to a top of the slider, and the slider bringing along the push button to slide horizontally;

a first switch positioned to one side of the sliding path;

a second switch positioned to the other side of the sliding path;

a third switch positioned to a center of the sliding path; and two stopping blocks positioned at two opposite sides of the sliding path, respectively to limit a sliding displacement of the push button, the two stopping blocks forming two partial shells of the first switch and the second switch, respectively, wherein when the slider moves to the one side of the sliding path, the blocking block is propped by one partial shell to avoid the push button moving downward, and when the slider moves to the other side of the sliding path, the blocking block is propped by the other partial shell to avoid the push button moving downward.

7. A slide switch, comprising:

a housing, an inside of the housing forming an accommodating space, the housing including a front housing and a rear housing covered to a rear of the front housing, the accommodating space being formed between the front housing and the rear housing, the front housing having a front wall, and a first top wall protruded rearward from a top of the front wall, the rear housing having a rear wall opposite to the front wall, and a second top wall protruded frontward from a top of the rear wall, two middles of two inner surfaces of the front wall and the rear wall of the housing protruding inward to form two supporting portions;

two guiding slots, one guiding slot being formed between the first top wall and a top surface of one supporting portion, the other guiding slot being formed between the second top wall and a top surface of the other supporting portion, a horizontal sliding path being formed among the two guiding slots and the two supporting portions;

a slider mounted between the two guiding slots to make the slider slide horizontally along the sliding path, a middle of a bottom of a front end of the slider protruding downward to form a blocking block;

a push button perpendicularly mounted to a top of the slider, and the slider bringing along the push button to slide horizontally;

a first switch positioned to one side of the sliding path;

a second switch positioned to the other side of the sliding path, the first switch being spaced from the second switch;

a third switch positioned to a center of the sliding path, the third switch being positioned between the first switch and the second switch, the first switch, the second switch and the third switch being disposed separately; and two partial shells of the first switch and the second switch positioned at two opposite sides of the sliding path, respectively to limit a sliding displacement of the push button, an interval being formed between the two partial shells, the first switch and the second switch further having two trigger blocks positioned on two top surfaces of the two partial shells, wherein when the slider is pushed to a terminal position of one of the two opposite sides of the sliding path, the blocking block pushes against the trigger block of one of the first switch and the second switch, and the blocking block triggers the one of the first switch and the second switch, and wherein when the push button is pushed to make the slider back to the center of the sliding path, the blocking block moves away from the two partial shells, at the moment, the push button is able to be pressed downward to make the blocking block trigger the third switch, when the push button is pressed downward, the blocking block passes downward through the sliding path and passes through the interval between the two partial shells, the slider and the push button are further limited to slide horizontally.

* * * * *